United States Patent [19]
Jödicke et al.

[11] Patent Number: 5,859,723
[45] Date of Patent: Jan. 12, 1999

[54] ELECTROCHROMIC PANE ARRANGEMENT

[75] Inventors: Dirk Jödicke, Gelsenkirchen, Germany; Richard Anders Batchelor, Merseyside, United Kingdom

[73] Assignee: Flachglas AG, Furth, Germany

[21] Appl. No.: 586,838

[22] PCT Filed: May 16, 1995

[86] PCT No.: PCT/EP95/01861
§ 371 Date: Jan. 17, 1996
§ 102(e) Date: Jan. 17, 1996

[87] PCT Pub. No.: WO95/31746
PCT Pub. Date: Nov. 23, 1995

[30] Foreign Application Priority Data

May 17, 1994 [DE] Germany ............ 44 17 219.2
May 17, 1994 [DE] Germany ............ 44 17 220.6

[51] Int. Cl.$^6$ ...................................... G02F 1/153
[52] U.S. Cl. ............................. 359/270; 429/192
[58] Field of Search ................. 359/265, 269, 359/270, 273, 274; 429/191, 192

[56] References Cited

U.S. PATENT DOCUMENTS

| | | | |
|---|---|---|---|
| 4,773,740 | 9/1988 | Kawakami et al. | 350/357 |
| 5,016,991 | 5/1991 | Mason | 359/265 |
| 5,206,756 | 4/1993 | Cheshire | 359/270 |
| 5,332,530 | 7/1994 | Eid et al. | 252/583 |

*Primary Examiner*—Georgia Y. Epps
*Assistant Examiner*—Dawn-Maui Bey
*Attorney, Agent, or Firm*—Hill & Simpson

[57] ABSTRACT

An electrochromic pane arrangement is disclosed having a first transparent electrode substrate or glass pane and a second electrode substrate or glass pane arranged parallel to and at a distance from the first glass pane. An ion conducting layer is disposed adjoining the two electrode substrates and consists of a polymer matrix containing at least one salt including difficult to oxidize anions. The conducting layer also includes one dopant suitable for the provision of cations, preferably metal ions. A surface of the first electrode substrate faces toward the ion conducting layer and is a first transparent electrode layer. Adjacent to it is an actively electrochromic layer in surface contact with the ion conducting layer, preferably of tungsten trioxide. This ion conducting layer has a reversibly variable transparency and/or color as a result of absorption or emission of electrons via the first electrode layer and acceptance or emission of ions of the dopant from or to the ion conducting layer. A surface of the second electrode substrate faces toward the ion conducting layer and bears a second transparent electrode layer. Adjacent to it is a transparent layer in surface contact with the ion conducting layer and is suitable for the reversible storage of charge, preferably by ion insertion. The ion conducting layer includes at least one salt having a proportion of an easily oxidizable anion and/or at least one easily oxidizable organic compound. The compound is electrically neutral and undergoes no color change upon changing the transmission of the electrochromic pane arrangement.

56 Claims, 1 Drawing Sheet

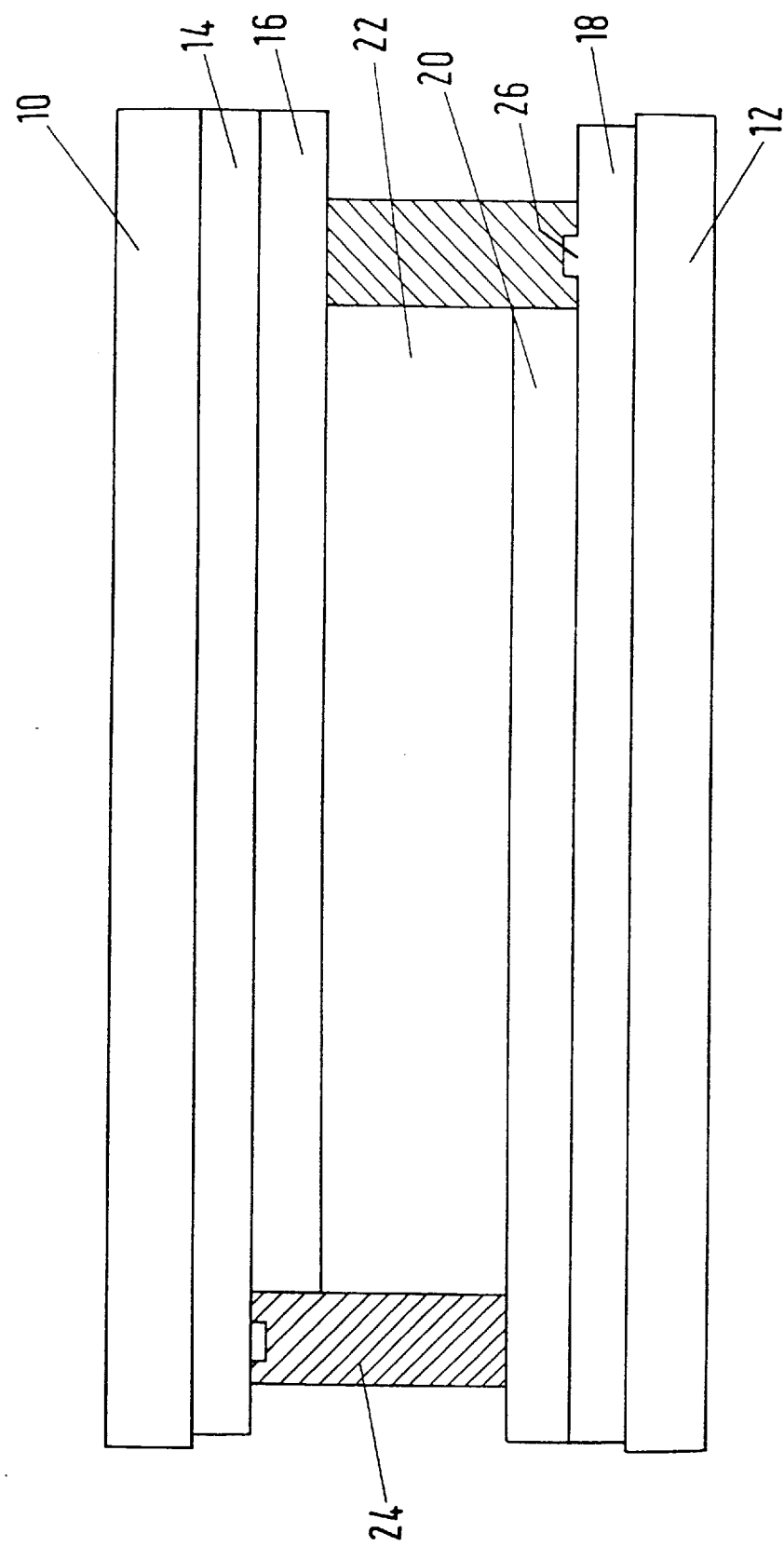

ELECTROCHROMIC PANE ARRANGEMENT

BACKGROUND OF THE INVENTION

1. Field of The Invention

The present invention relates generally to display devices, and in particular, to an electrochromic pane arrangement.

2. Description of the Related Art

Electrochromic pane arrangements for use as display devices are known in the art. Such electrochromic panes may typically have a first transparent electrode substrate or glass pane, a second electrode substrate or glass pane arranged parallel to and at a distance from the first glass pane, and an ion conducting layer joining the two electrode substrates. The ion layers may consist of a polymer matrix containing at least one salt including difficult to oxidize anions, and at least one dopant suitable for the provision of cations, preferably metal ions. A surface of the first electrode substrate faces toward the ion conducting layer and bears a first transparent electrode layer. Adjacent to it is an actively electrochromic layer in surface contact with the ion conducting layer. The electrochromic layer is preferably of tungsten trioxide, having a reversibly variable transparency and/or color resulting from absorption or emission of electrons via the first electrode layer and acceptance or emission of ions of the dopant from or to the ion conducting layer. A surface of the second electrode substrate faces towards the ion conducting layer and bears a second transparent electrode layer. Adjacent to it is a transparent layer in surface contact with the ion conducting layer. The transparent layer is suitable for the reversible storage of charge, preferably by ion insertion.

An electrochromic laminated pane of this type is known from DE-A 41 16 059, where the two individual panes are joined to one another by means of a polyvinylbutyral layer which represents the ion conducting layer. The polyvinylbutyral layer, which is a film of polyvinylbutyral sufficiently well-known for the manufacture of laminated safety glass panes, contains $LiClO_4$ as dopant.

Electrochromic pane arrangements do not as a rule evidence any electrochromic properties in their freshly manufactured state, unless the electrochromic layer and/or the charge storage layer have been precharged by the insertion of positive ions. Otherwise, only after so-called preconditioning, does the pane arrangement acquire the property of variable light transmission. For the purpose of preconditioning, the pane arrangement is switched several times at low voltages and low cycle time after connection of a DC voltage. One cycle always consists of a colouration and bleaching period. During colouration and bleaching, identical or differing voltages can be applied, but with reversed polarities, where the pane incorporating the actively electrochromic layer, normally taking the form of a $WO_3$ layer, is connected during colouration as a cathode, but on the other hand as an anode during bleaching.

A first type of preconditioning is characterized by successive increase of the switching times and of the voltages applied.

It has been found favourable at the beginning of preconditioning to choose the colouration period of longer duration than the bleaching period, as then lower transmission values can be induced in the pane arrangement in stages. This method of preconditioning leads to a high transmission range, but is very time-consuming on account of the high number of cycles, this time requirement naturally increasing the cost of manufacture of the pane arrangement.

If it is desired to avoid the considerable time involved in the type of preconditioning used in the procedure described above, it is also known in the state of the art that the individual electrode layers can be charged with lithium ions. Either the actively electrochromic layer or the above-mentioned ion storage layer is charged with for example lithium ions before assembly to form the electrochromic pane arrangement. This is done by immersing the individual pane to be preconditioned in each case in a liquid electrolyte solution and applying a DC voltage. As counter electrode, there is a metal plate or also a glass pane matched to the pane size which is provided with an electronically conductive layer, where the electrolyte solution is composed as a rule of propylene carbonate and a lithium salt. By these means, it is possible to achieve a considerable reduction in the preconditioning time in comparison with the type of preconditioning described above, but there is the disadvantage that an additional operation is necessary, with the corresponding cleaning problems and difficulties involved in the production of the glass sandwich from the preconditioned individual panes, so that the production of electrochromic pane arrangements is relatively time-consuming, even with this second type of preconditioning.

An electrochromic pane arrangement of the type mentioned at the beginning is known from EP-B 0 083 988, where the ion conducting layer takes the form of a cast resin layer, where propylene carbonate is used as solvent for the conducting salt $LiClO_4$. Here as well, the preconditioning problems described above occur.

In EP-B 0 098 416, an electrochromic pane arrangement similar to that of the generic type is described, where for the ion conducting layer a polymethyl methacrylate-based or a copolymer of methyl methacrylate/methacrylic acid-based lithium ion conductor is used. The preconditioning problems of the type described further above are also present with the procedure according to this publication.

Finally, an electrochromic pane arrangement of another type is known from EP-A 0 495 220, where no electrochromic layer is used, but a metal, for example Cu and/or Bi, is deposited on a glass surface, as a result of which darkening occurs. This reaction is reversible. On the counter-electrode not defined in detail, the anion of the salt in question is oxidized, this action also being reversible. To increase the solubility of CuCl and/or $BiCl_3$, a further salt can be added in the liquid electrolyte whose anions can form complexes with Cu. Lithium bromide is used in preference for this purpose. Finally, a salt with non-complexing anions can also be used, $LiClO_4$ being used in preference. According to the data of EP-B 0 495 220, the switching properties should be improved thereby. A problem with this procedure is the fact that in the event of a fracture of the pane arrangement or any other form of leak, the electrolyte liquid can escape, which will occasion considerable contamination problems. In addition, the use of the liquid electrolyte, in which lithium bromide and where applicable $LiClO_4$ are present for an increase in solubility or an improvement of the switching properties, does not permit the design of large-area switching elements. Finally, only relatively low operating voltages of not more than 2 volts are possible, as otherwise decomposition reactions can occur in the liquid electrolyte.

SUMMARY OF THE INVENTION

The purpose of the invention is to develop the pane arrangement of the generic type such that whilst retaining the advantages of the use of a solid electrolyte, which at the same time acts as a lamination between the two electrode substrates, particularly therefore glass panes, considerable simplification of the preconditioning and thus of the production as a whole becomes possible.

According to the invention, this problem is solved by the invention by the ion conducting layer including at least one salt comprising a proportion of an easily oxidisable anion and/or at least one easily oxidisable organic compound, which is electric ally neutral and undergoes no colour change upon changing the transmission of the electrochromic pane arrangement. The said salt(s) comprising easily oxidisable anions is/are, therefore, partly or completely replaceable by said at least one easily oxidisable organic compound.

It has been found that such electrically neutral organic compounds which can be easily oxidised at the charge storage layer, connected as the anode, whereas $WO_3$ being the cathode, do not only provide electrons at the anode for accelerating the preconditioning phase. Furthermore, they can act as a plasticizer since they are not incorporated into the acrylate polymer.

Provision can be made for the salt(s) incorporating the difficult to oxidise and the easily oxidisable anion(s) to have different cations.

According to the invention, provision can also be made for the salt(s) incorporating the difficult to oxidise and the easily oxidisable anion(s) to have the same cation.

The invention is characterized by the use of lithium as cation for the difficult to oxidise salt(s).

The invention provides for the salt(s) with difficult to oxidise anions to consist of lithium cations with one variable anion and is/are selected from the group including perchlorate, tetrafluoroborate, hexafluorophosphate, hexafluoroarsenate and trifluoromethanesulphonate.

The invention is characterized by the use of lithium, sodium, potassium, hydrogen, ammonium or tetraalkyl ammonium or mixtures of at least two of the aforementioned materials as cation(s) for the easily oxidisable salt(s).

According to the invention, provision can also be made for the salt(s) with easily oxidisable anions to be selected from the group including bromide, formiate, cyanide, cyanate, acetate, trifluoroacetate, citrate, lactate, oxalate, benzoate, acetylacetonate, rhodanide, sulphite, thiosulphate, disulphite, dithionite, dithionate, phosphite and hypophosphite as well as mixtures of at least two of the aforementioned materials.

The invention also proposes that the proportion of the salt(s) in the ion conducting layer with difficult to oxidise anions should be 0.5 to 5.0 mol %.

Provision can be made thereby for the proportion of the salt(s) with difficult to oxidise anions to be 1 to 4 mol %.

The invention also provides for the proportion of the salt(s) with easily oxidisable anions to be 0.001 to 0.5 mol %.

Preferably, said easily oxidisable organic compound which is electrically neutral and undergoes no colour change upon changing the transmission of the electrochromic pane arrangement is selected from the group consisting of primary and/or secondary alcohols carrying at least one OH group and mixtures thereof.

One subgroup of such alcohols consists of primary and secondary aliphatic alcohols which are branched or unbranched and mixtures thereof. Examples are methanol, ethanol, 1-propanol, 2-propanol, 1-butanol, 2-butanol, sec-butyl alcohol and higher homologues and mixtures thereof.

Another subgroup consists of branched or unbranched diols, triols and alcohols comprising more than three OH groups and mixtures thereof. Examples are ethylene glycol, diethylene glycol, triethylene glycol, tetraethylene glycol, propylene glycol, dipropylene glycol, tripropylene glycol, tetrapropylene glycol, 1,4-butane diol, 2,3-butane diol, 1,5-pentane diol, 1,6-hexane diol, 1,2,3-propane triol, trimethylol propane, pentaerythritol or the like and mixtures thereof.

Still another subgroup consists of saturated cyclic primary and secondary alcohols and mixtures thereof. Examples are cyclopropanol, cyclobutanol, cyclopentanol, cyclohexanol, 1-cyclopropylethanol or the like and mixtures thereof.

Preferably, the proportion of primary and/or secondary alcohols carrying at least one OH group is 0.01 to 5 mol %.

Provision can also be made for the thickness of the ion conducting layer to be 0.2 to 2.0 mm.

The invention also provides for the thickness of the ion conducting layer to be approximately 1 mm.

The invention also proposes that the ion conducting layer should take the form of an acrylate based cast resin layer.

Provision can be made for the salts and/or the easily oxidisable organic compounds) of the ion conducting layer being introduced into the cast resin mixture for manufacture of the polymer matrix for the ion conducting layer before polymerization.

According to the invention, provision can be made for the cast resin mixture for manufacture of the polymer matrix for the ion conducting layer incorporating at least one acrylic and/or methacrylic ester, at least one plasticizer also, acting as solvent for the salts and at least one polymerization initiator.

The invention also proposes that the cast resin mixture incorporates at least one cross-linking agent.

Provision can be made thereby for the acrylic and or methacrylic ester(s) of the cast resin mixture for the manufacture of the polymer matrix of the ion conducting layer to include at least one component of the following group: all branched or unbranched saturated aliphatic (meth)acrylic esters, in particular methyl, ethyl, n-propyl, iso-propyl, n-butyl, iso-butyl, sec-butyl, tert-butyl- and 2-ethyl-1-hexyl-(meth)acrylic esters.

Provision can also be made for the proportion of the cast resin mixture of saturated aliphatic (non-functionalised) (meth)acrylic esters to be between 60 and 95 mol %.

The invention also provides for the proportion of the cast resin mixture of saturated aliphatic (non-functionalised) (meth)acrylic esters is between 70 and 90 mol %.

Provision can be made thereby for the cast resin mixture to incorporate at least one hydroxyalkyl ester of acrylic or methacrylic acid which has at least one primary and/or secondary and/or tertiary hydroxy group which is to be found in a branched or unbranched alkyl group.

The invention also proposes that the hydroxyalkyl ester(s) be selected from the group containing 2-hydroxyethyl acrylate, 1-hydroxypropyl acrylate, 2-hydroxypropyl acrylate, 1,4-butanediol monoacrylate and 1,6-hexanediol monoacrylate.

The invention also proposes that the proportion of the cast resin mixture of hydroxyalkyl (meth)acrylic ester(s) be 0.5 to 15 mol %.

Provision can also be made for the proportion of the cast resin mixture of hydroxyalkyl (meth)acrylic ester(s) to be 1 to 5 mol %.

Provision can also be made thereby for the plasticizer(s) to be selected from the group containing propylene carbonate, ethylene carbonate, gamma-butyrolactone, N-methyl pyrrolidone, 1,3-dimethyl-2-imidazolidinone, 3-methyl-2-oxazolidinone, dimethyl formamide, dimethyl sulphoxide, dimethoxy ethane and diethylene glycol monoethyl ether, as well as mixtures of at least two of the aforementioned materials.

The invention also provides for the proportion of the cast resin mixture of plasticizer(s) to be 5 to 30 mol %.

According to the invention, provision can also be made for the proportion of the cast resin mixture of plasticizer(s) is at the most 25 mol %.

Provision can also be made for the cross-linking agent(s) to incorporate at least a compound which possesses at least two acrylate or methacrylate groups per molecule, such as 1,4-butanediol diacrylate, 1,6-hexanediol diacrylate, ethylene glycol diacrylate, di-ethylene glycol diacrylate, tri-ethylene glycol diacrylate, propylene glycol diacrylate, di-propylene glycol diacrylate, tri-propylene glycol diacrylate, tri-methylol propane triacrylate, ditrimethylol propane tetraacrylate, dipentaerythritol pentaacrylate and/or pentaerythritol tetraacrylate.

The invention also provides for the proportion of the cast resin mixture of cross-linking agent is up to 10 mol %.

Furthermore, the invention provides for the proportion of the cast resin mixture of cross-linking agent to be 5 mol % at maximum.

Provision can also be made for the polymerization initiator proportion of the cast resin mixture is 0.01 to 0.5 mol %.

The invention also provides for the polymerization initiator proportion of the cast resin mixture to be 0.02 to 0.3 mol %.

Provision can also be made thereby for the polymerization initiator(s) to be selected from the group incorporating hydroxycyclohexyl-phenyl ketone, 2-hydroxy-2-methylphenyl-1-propanon, 2,4,6-trimethylbenzoyldiphenyl phosphine oxide and/or ethyl-2,4,6-trimethylbenzoylphenylphosphinate.

The invention also proposes that the thickness of the first and/or of the second electrode layer be 100 to 400 nm.

The invention also provides for the thickness of the first (14) and/or the second electrode layer (18) to be approximately 300 nm.

Provision can be made thereby for the first electrode layer and/or the second electrode layer to consist of indium tin oxide.

Provision can be made thereby for the first electrode layer and/or the second electrode layer to consist of fluorine-doped tin oxide.

Provision can be made thereby for the thickness of the actively electrochromic layer (16) to be 250 to 500 nm.

The invention also provides for the thickness of the actively electrochromic layer to be approximately 350 nm.

Provision can also be made for the second electrode layer to bear on its side facing towards the ion conducting layer a passively or actively electrochromic charge storage layer.

The invention also proposes that the charge storage layer (20) have a thickness of 200 up to 400 nm.

Provision can also be made for the charge storage layer to have a thickness of 280 nm.

Finally, the invention also provides for the charge storage layer to consist of cerium titanium oxide, nickel oxide, cobalt oxide, chromium oxide, vanadium oxide and/or iridium oxide.

Further features and advantages of the present invention are described in the detailed description below, in which an embodiment is explained in detail with the aid of the schematic drawing.

BRIEF DESCRIPTION OF THE DRAWING

FIG. 1 illustrates a cross-sectional view of an electrochromic pane arrangement constructed in accordance with the present invention taken perpendicular to the plane of the electrode substrates.

DETAILED DESCRIPTION OF THE PREFERRED EMBODIMENTS

The principles and mechanisms underlying the present invention are set forth below in the detailed description, in the illustrative FIG. 1, and in the examples provided.

If the polarity is chosen as to colour the electrochromic pane the lithium ions, usually present, dissolved in the ion conducting layer are attracted to the $WO_3$ cathode and intercalate into this layer. To maintain electron neutrality it is required that at that time either a respective number of cations from the counter electrode enter into the polymer or a respective number of anions migrate into the counter electrode. None of these events will occur with freshly manufactured panes, since there are, at the beginning, no cations present at the counter electrode, on the other hand, the rather large perchlorate ions are prevented from entering into the counter electrode.

The invention is based on the surprising principle that it is possible to achieve considerable simplification of the manufacture of electrochromic pane arrangements by eliminating the necessity for preconditioning by means of cyclic colouration and bleaching or individual preconditioning of the individual panes used in the immersion process by using for manufacture of the ion conducting layer a cast resin mixture to which small quantities of in particular lithium salts with easily oxidisable anions, in particular lithium bromide, and/or one or more easily oxidisable electrically neutral organic compounds, in particular diols and triols, are added.

With the example of the additive lithium bromide, the "autogenous preconditioning" according to the invention can be illustrated as follows:

If a voltage is applied to the pane arrangement according to the invention such that the electrochromic layer is polarized as cathode, lithium ions from the ion conducting layer can enter the tungsten oxide coating. The voltage source provides the electrons necessary for charge equalization. This operation leads to a change in the oxidation state of some of the tungsten ions of the tungsten-(VI)-oxide layer of +6 to +5. The simultaneous presence of both tungsten ions causes a change in the absorption behaviour and consequently colouration. This process is of course only made possible by an oxidation reaction taking place on the second electrode layer, that is to say the counter-electrode, which can provide sufficient electrons. This oxidation reaction consists of the irreversible electron emission by the bromide ion. In addition, elemental bromine is produced which is intercepted by residual monomers which are always present in the cast resin. It is necessary for this oxidation reaction to be irreversible and only to take place in the initial stage of preconditioning. For this reason, the quantity of lithium bromide added must be kept low. According to the invention, one therefore uses between 0.01 and 0.5 mol % in the cast resin mixture.

If the electrochromic pane arrangement is coloured in the manner described above, bleaching can be achieved by means of polarity reversal. When this happens, lithium removal takes place on the actively electrochromic layer, and at the same time the oxidation state of the tungsten resumes the value of +6. The actively electrochromic layer lightens, where upon the reactions described above, that is to say lithium intercalation and lithium emission, are reversible processes. At the same time, with lithium emission of the actively electrochromic layer, that is to say of the tungsten oxide electrode, lithium intercalation in the cerium titanium oxide counter-electrode used preferably according to the invention is initiated, which is also reversible here. The irreversible oxidation reaction of the bromide ions now has no further significance for the function of the electrochromic pane arrangement after the process of "autogenous preconditioning" described above has been completed.

As a representative for electrically neutral easily oxidisable organic compounds which are suitable for the invention, diethylene glycol monomethylether is chosen.

Whereas,

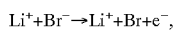

it is

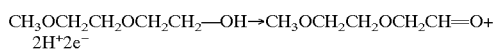

in the case of the electrically neutral easily oxidisable organic compounds, and the process will run similarly as described above with respect to lithium bromide.

It should be mentioned that as is the case with the state of the art of technology, the function of the electrode layers, preferably indium tin oxide coatings, consists of rendering the surface of the glass panes used preferably as transparent electrode substrate electrically conductive. This is also necessary on the first electrode substrate as the actual electrochromic material, in the case of $WO_3$ is an insulator. The use of the $Ce_xTi_yO_z$-coated counter-electrode has in contrast to the use of a pure ITO (indium tin oxide) counter-electrode the advantage that irreversible brown discolouration takes place to a negligible extent or not at all. In addition, the $Ce_xTi_yO_z$ coating acts as an ion storage medium.

The function of the cast resin, whose principal component is a mixture of various acrylic and/or methacrylic esters, consists in the case of the pane according to the invention of establishing a conductive connection between the two electrode layers. For this purpose, the cast resin is ion conductive, for which lithium salts have proved particularly suitable. The function of the plasticizer is assumed preferably by propylene carbonate (4-methyl-1-1,3-dioxolane2-on), a polar aprotic solvent which possesses a low melting point (−48° C.) and a high boiling point (241° C.). These properties are particularly favourable for high and low temperature stability of the finished electrochromic pane arrangement according to the invention. To the acrylate is added preferably approximately 0.1 mol % polymerization initiator, as well as if necessary a cross-linking agent.

As illustrated in FIG. 1, the electrochromic pane arrangement according to the invention incorporates in the case of the embodiment shown here a first glass pane 10 and a second glass pane 12, both of which are essentially flat and measure approximately 40×80 cm². The first glass pane 10 bears on its surface facing downwards in the drawing a first electrode layer 14 which is an indium tin oxide (ITO) layer with a thickness of approximately 300 nm. To the first electrode layer 14 is applied an actively electrochromic layer 16 of $WO_3$ with a thickness of 350 nm.

The second glass pane 12 bears on its side facing towards the first glass pane 10 a second electrode layer 18, also consisting of indium tin oxide, with a thickness of 300 nm. Adjacent to the second electrode layer 18 on the side opposite the second glass pane 12 is an charge storage layer or ion storage layer 20 of $Ce_xTi_yO_z$ having a thickness of 280 nm. The two glass panes 10, 12 provided with the coatings described above are joined to one another in the fashion of a laminated pane by an ion conducting layer 22, which in the case of the embodiment shown has a thickness of 1 mm and consists of a polymer matrix with dissolved salts.

Contacts are provided at the first 14 and second 18 electrode layer, as exemplarily shown at reference numeral 26 for the second electrode layer 18, to be connected with a suitable power supply. A fluid-tight sealing 24 is designed to enclose the ion conducting layer 22 and to accommodate, at least partly, the contacts, as 26.

In the case of the embodiment shown, the cast resin mixture which has been used for manufacture of the ion conducting layer 22 has a composition of 76.6 mol % n-butylacrylic ester, 1.9 mol % 1,4-butanediol monoacrylate, 17.9 mol % propylene carbonate, 3.1 mol % $LiClO_4$ and 0.5 mol % LiBr. Good results have also been achieved with a cast resin mixture which incorporated 60–90 mol % n-butyl acrylic ester, 1.5–2 mol % butanediol monoacrylate, 10–20 mol % propylene carbonate, 1–5 mol% $LiClO_4$ and 0.01–1 mol % LiBr.

Of course, the plasticizer component propylene carbonate can also be replaced by other plasticizers. In the same way, lithium bromide (LiBr) is only a representative of the class of substances of lithium salts with easily oxidisable anions, so that here as well other changes are possible.

As polymerization initiators for the curing of the cast resin mixture initiated by UV light, suitable are in particular hydroxycyclohexyl phenyl ketone, obtainable under the trade name Irgacure 184, 2-hydroxy-2-methylphenyl-1-propanon, obtainable under the trade name Irgacure 1173, a mixture of 70% Irgacure 1173 and 30% Lucirin TPO, available under the trade name Darocure 4263, a mixture of 50% Irgacure 1173 and 50% Lucirin TPO, available under the trade name Darocure 4265, 2,4,6-trimethylbenzoyl diphenylphosphine oxide, available under the trade name Lucirin TPO and/or ethyl-2,4,6-trimethylbenzoylphenylphosphinate.

Especially preferred are the above mentioned catalysts Darocure 4263 or Irgacure 184.

Below are given embodiments of the cast resin mixture usable according to the invention in addition to all other components for the ion conducting layer:

EXAMPLE 1

983 g corresponding to 78.55 weight % or 76.21 mol % n-butyl acrylate, 24 g corresponding to 1.92 weight % or 1.66 mol % 1,4-butanediol monoacrylate, 185 g corresponding to 14.78 weight % or 17.99 mol % propylene carbonate, 33 g corresponding to 2.64 weight% or 3.08 mol % lithium perchlorate, 1.2 g corresponding to 0.10 weight % or 0.14 mol % lithium bromide, 24 g corresponding to 1.92 weight% or 0.86 mol % tripropylene glycol diacrylate and 1.3 g corresponding to 0.10 weight % or 0.06 mol % polymerization initiator (Darocure 4263).

EXAMPLE 2

950 g corresponding to 73.73 weight % or 71.88 mol % n-butyl acrylate, 50 g corresponding to 3.88 weight % or 3.78 mol % tert-butyl acrylate, 32 g corresponding to 2.48 weight % or 2.15 mol % 1,4-butanediol monoacrylate, 150 g corresponding to 11.64 weight % or 14.24 mol % propylene carbonate, 30 g corresponding to 2.33 weight % or 3.30 mol % ethylene carbonate, 33 g corresponding to 2.56 weight % or 3.00 mol % lithium perchlorate, 1.5 g corresponding to 0.12 weight % or 0.17 mol % lithium bromide, 40 g corresponding to 3.10 weight % or 1.40 mol % tripropylene glycol diacrylate and 2.0 g corresponding to 0.2 weight % or 0.07 mol % polymerization initiator (Darocure 4265).

In the following examples, lithium bromide has been replaced partially (example 3) or completely (example 4) by alcohols suitable for the invention.

EXAMPLE 3

950 g corresponding to 72.55 weight % or 70.60 mol % n-butyl acrylate, 50 g, corresponding to 3.82 weight % or 3.27 mol % tert-butylacrylate, 40 g corresponding to 3.05 weight % or 2.64 mol % 1,4-butanediol monoacrylate, 160 g corresponding to 12.22 weight % or 14.92 mol % propylene carbonate, 30 g corresponding to 2.29 weight % or 3.24 mol % ethylene carbonate, 35 g corresponding to 2.67 weight % or 3.12 mol % lithium perchlorate, 1 g corresponding to 0.08 weight % or 0.11 mol % lithium bromide, 40 g corresponding to 3.05 weight % or 1.38 mol % tripropylene glycol diacrylate, 2 g corresponding to 0.15 weight % or 0.23 mol % 1,2,3-propane triol and 1.5 g corresponding to 0.11 weight % or 0.04 mol % polymerization initiator, namely 2,4,6-trimethylbenzoyl diphenyl phosphine oxide, acting as UV initiator.

EXAMPLE 4

235 g corresponding to 77.48 weight % or 74.50 mol % n-butyl acrylate, 10 g corresponding to 3.30 weight % or 2.82 mol % 1,4-butanediol monoacrylate, 45 g corresponding to 14.84 weight % or 17.91 mol % propylene carbonate, 3 g corresponding to 1.00 weight % or 0.92 mol % trimethylol propane, 10 g corresponding to 3.30 weight % or 3.81 mol % lithium perchlorate, and 0.3 g corresponding to 0.10 weight % or 0.04 mol % polymerization initiator, namely 2,4,6-trimethylbenzoyl dipheny phosphine oxide, acting as UV initiator.

The manufacture of the pane arrangement described above took place in a manner such that first of all the cast resin mixture with all components was produced, that is to say including the lithium salts and/or the easily oxidisable organic compound. Then, a laminated pane was produced by casting in the manner known from the manufacture of laminated safety panes, which then represented the electrochromic arrangement according to the invention.

By means "autogenous preconditioning", in the manner already described above, satisfactory function of the pane arrangement was achieved without tedious preconditioning cycles.

The features of the invention disclosed in the preceding description, in the drawing, as well as in the claims can be essential both individually as well as in any combination for realization of the invention in its various embodiments.

What is claimed is:

1. An electrochromic pane arrangement comprising: a first transparent electrode substrate, a second electrode substrate arranged parallel to and at a distance from the first transparent electrode substrate, and an ion conducting layer joining the first and second electrode substrates comprising a polymer matrix, at least one salt including difficult to oxidise anions, at least one dopant for providing cations and at least one salt including easy to oxidise anions, wherein a surface of the first transparent electrode substrate facing towards the ion conducting layer includes a first transparent electrode layer disposed thereon and an active electrochromic layer disposed on the first transparent electrode layer in surface contact with the ion conducting layer whose transparency and/or color is reversibly variable as a result of absorption or emission of electrons via the first electrode layer and acceptance or emission of ions of the dopant from/to the ion conducting layer, and a surface of the second electrode substrate facing towards the ion conducting layer including a second transparent electrode layer disposed thereon, and a third transparent layer disposed on the second transparent electrode layer in surface contact with the ion conducting layer capable of reversibly storing charge.

2. Pane arrangement in accordance with claim 1, characterized in that the salt(s) incorporating the difficult to oxidise and the easily oxidisable anion(s) has/have different cations.

3. Pane arrangement in accordance with claim 1, characterized in that the salt(s) incorporating the difficult to oxidise and the easily oxidisable anion(s) has/have the same cation.

4. Pane arrangement in accordance with claim 1, characterized by the use of lithium as cation for the difficult to oxidize salt(s).

5. Pane arrangement in accordance with claim 4, characterized in that the salt(s) with difficult to oxidise anions consist(s) of lithium cations with one variable anion and is/are selected from the group including perchlorate, tetra fluoroborate, hexafluorophosphate, hexafluoroarsenate and trifluoromethanesulphonate.

6. Pane arrangement in accordance with claim 1, characterized by the use of lithium, sodium, potassium, hydrogen, ammonium or tetraalkyl ammonium or mixtures of at least two of the aforementioned materials as cation(s) for the easily oxidizable salt(s).

7. Pane arrangement in accordance with claim 1, characterized in that the salt(s) with easily oxidizable anions is/are selected from the group including bromide, formate, cyanide, cyanate, acetate, trifluoroacetate, citrate, lactate, oxalate, benzoate, acetylacetonate, rhodanide, sulphite, thiosulphate, disulphite, dithionite, dithionate, phosphate and hypophosphite, as well as mixtures of at least two of the aforementioned materials.

8. Pane arrangement in accordance with claim 1, characterized in that the proportion of the salt(s) in the ion conducting layer with difficult to oxidize anions is 0.5 to 5.0 mol %.

9. Pane arrangement in accordance with claim 8, characterized in that the proportion of the salt(s) with difficult to oxidise anions is 1 to 4 mol %.

10. Pane arrangement in accordance with claim 1, characterized in that the proportion of the salt(s) with easily oxidizable anions is 0.001 to 0.5 mol %.

11. Pane arrangement in accordance with claim 10, characterized in that said easily oxidisable organic compound which is electrically neutral and undergoes no colour change upon changing the transmission of the electrochromic pane arrangement is selected from the group consisting of primary and/or secondary alcohols carrying at least one OH group and mixtures thereof.

12. Pane arrangement in accordance with claim 11, characterized in that said alcohol is selected from the group consisting of primary and secondary aliphatic alcohols which are branched or unbranched and mixtures thereof.

13. Pane arrangement in accordance with claim 12, characterized in that said aliphatic alcohol is selected from the group consisting of methanol, ethanol, 1-propanol, 2-propanol, 1-butanol, 2-butanol, sec-butyl alcohol, and higher homologues and mixtures thereof.

14. Pane arrangement in accordance with claim 11, characterized in that said alcohol is selected from the group consisting of branched or unbranched diols, triols and alcohols comprising more than three OH groups and mixtures thereof.

15. Pane arrangement in accordance with claim 14, characterized in that said alcohol is selected from the group consisting of ethylene glycol, diethylene glycol, triethylene glycol, tetraethylene glycol, propylene glycol, dipropylene glycol, tripropylene glycol, tetrapropylene glycol, 1,4-butane diol, 2,3-butane diol, 1,5-pentane diol, 1,6-hexane diol, 1,2,3-propane triol, trimethylol propane, pentaerythritol or the like and mixtures thereof.

16. Pane arrangement in accordance with claim 11, characterized in that said alcohol is selected from the group consisting of saturated cyclic primary and secondary alcohols and mixtures thereof.

17. Pane arrangement according to claim 16, characterized in that said alcohol is selected from the group consisting of cyclopropanol, cyclobutanol, cyclopentanol, cyclohexanol, 1-cyclopropylethanol or the like and mixtures thereof.

18. Pane arrangement according to claim 11, characterized in that the proportion of primary and/or secondary alcohols carrying at least one OH group is 0.01 to 5 mol %.

19. Pane arrangement in accordance with claim 1, characterized in that the thickness of the ion conducting layer (22) is 0.2 to 2.0 mm.

20. Pane arrangement in accordance with claim 19, characterized in that the thickness of the ion conducting layer (22) is approximately 1 mm.

21. Pane arrangement in accordance with claim 1, characterized in that the ion conducting layer (22) an acrylate based cast resin layer.

22. Pane arrangement in accordance with claim 21, characterized in that the salts of the ion conducting layer are introduced into said cast resin mixture for manufacture of the polymer matrix for the ion conducting layer (22) before polymerization.

23. Pane arrangement in accordance with claim 22, characterized in that the cast resin mixture for manufacture of the polymer matrix for the ion conducting layer (22) includes at least one acrylic and/or methacrylic ester, at least one plasticizer also acting as solvent for the salts and at least one polymerization initiator.

24. Pane arrangement in accordance with claim 23, characterized in that the cast resin mixture incorporates at least one cross-linking agent.

25. Pane arrangement in accordance with claim 23, characterized in that the acrylic and/or methacrylic ester(s) of the cast resin mixture for the manufacture of the polymer matrix of the ion conducting layer (22) include(s) at least one component of the following group: all branched or unbranched saturated aliphatic (meth)acrylic ester, in particular methyl, ethyl, n-propyl, iso-propyl, n-butyl, iso-butyl, sec-butyl, tert-butyl- and 2-ethyl-1-hexyl-(meth) acrylic esters.

26. Pane arrangement in accordance with claim 23, characterized in that the proportion of the cast resin mixture of saturated aliphatic (non-functionalised) (meth)acrylic esters is between 60 and 95 mol %.

27. Pane arrangement in accordance with claim 26, characterized in that the proportion of the cast resin mixture of saturated aliphatic (non-functionalised) (meth)acrylic esters is between 70 and 90 mol %.

28. Pane arrangement in accordance with claim 23, characterized in that the cast resin mixture incorporates at least one hydroxyalkyl ester of acrylic or methacrylic acid which has at least one primary and/or secondary and/or tertiary hydroxy group which is to be found in a branched or unbranched alkyl group.

29. Pane arrangement in accordance with claim 28, characterized in that the hydroxyalkyl ester(s) is/are selected from the group comprising 2-hydroxyethyl acrylate, 1-hydroxypropyl acrylate, 2-hydroxypropyl acrylate, 1,4-butanediol monoacrylate and 1,6-hexanediol monoacrylate.

30. Pane arrangement in accordance with claim 28, characterized in that the proportion of the cast resin mixture of hydroxyalkyl (meth)acrylic ester(s) is 0.5 to 15 mol %.

31. Pane arrangement in accordance with claim 30, characterized in that the proportion of the cast resin mixture of hydroxyalkyl (meth)acrylic ester(s) is 1 to 5 mol %.

32. Pane arrangement in accordance with claim 23, characterized in that the plasticizers is/are selected from the group comprising propylene carbonate, ethylene carbonate, gammabutyrolactone, N-methyl pyrrolidone, 1,3-dimethyl-2-imidazolidinone, 3-methyl-2-oxazolidinone, dimethyl formamide, dimethyl sulphoxide, dimethoxy ethane and diethylene glycol monoethyl ether, as well as mixtures of at least two of the aforementioned materials.

33. Pane arrangement in accordance with claim 23, characterized in that the proportion of the cast resin mixture of plasticizers is 5 to 30 mol %.

34. Pane arrangement in accordance with claim 33, characterized in that the proportion of the cast resin mixture of plasticizer(s) is at the most 25 mol %.

35. Pane arrangement in accordance with claim 24, characterized in that the cross-linking agent(s) includes at least a compound which possesses at least two acrylate or methacrylate groups per molecule, such as 1,4-butanediol diacrylate, 1,6-hexanediol diacrylate, ethylene glycol diacrylate, di-ethylene glycol diacrylate, tri-ethylene glycol diacrylate, propylene glycol diacrylate, di-propylene glycol diacrylate, tri-propylene glycol diacrylate, tri-methylol propane triacrylate, ditrimethylol propane tetraacrylate, dipentaerythritol pentaacrylate and/or pentaerythritol tetraacrylate.

36. Pane arrangement in accordance with claim 24, characterized in that the proportion of the cast resin mixture of cross-linking agent is up to 10 mol %.

37. Pane arrangement in accordance with claim 36, characterized in that the proportion of the cast resin mixture of cross-linking agent is of 5 mol % at maximum.

38. Pane arrangement in accordance with claim 24, characterized in that the polymerization initiator proportion of the cast resin mixture is 0.01 to 0.5 mol %.

39. Pane arrangement in accordance with claim 38, characterized in that the polymerization initiator proportion of the cast resin mixture is 0.02 to 0.3 mol %.

40. Pane arrangement in accordance with claim 24, characterized in that the polymerization initiators is/are selected from the group comprising hydroxycyclohexyl-phenyl ketone, 2-hydroxy-2methylphenyl-i-propanone, 2,4,6-trimethylbenzoyl-diphenyl phosphine oxide and/or ethyl-2, 4,6-trimethylbenzoylphenylphosphinate.

41. Pane arrangement in accordance with claim 1, characterized in that the thickness of the first (14) and/or of the second electrode layer (18) is 100 to 400 nm.

42. Pane arrangement in accordance with claim 41, characterized in that the thickness of the first (14) and/or the second electrode layer (18) is approximately 300 nm.

43. Pane arrangement in accordance with claim 1, characterized in that the first electrode layer (14) and/or the second electrode layer (18) consist(s) of indium tin oxide.

44. Pane arrangement in accordance with claim 1, characterized in that the first electrode layer (14) and/or the second electrode layer (18) consist(s) of fluorine-doped tin oxide.

45. Pane arrangement in accordance with claim 1, characterized in that the thickness of the actively electrochromic layer (16) is 250 to 500 nm.

46. Pane arrangement in accordance with claim 45, characterized in that the thickness of the actively electrochromic layer (16) is approximately 350 nm.

47. Pane arrangement in accordance with claim 1, characterized in that the third transparent layer (18) is a passively or actively electrochromic charge storage layer (20).

48. Pane arrangement in accordance with claim 47, characterized in that the charge storage layer (20) has a thickness of 200 up to 400 nm.

49. Pane arrangement in accordance with claim 48, characterized in that the charge storage layer (20) has a thickness of 280 nm.

50. Pane arrangement in accordance with claim 47, characterized in that the charge storage layer (20) consists of cerium titanium oxide, nickel oxide, cobalt oxide, chromium oxide, vanadium oxide and/or iridium oxide.

51. An electrochromic pane arrangement as defined in claim 1, wherein the first transparent electrode substrate comprises glass.

52. An electrochromic pane arrangement as defined in claim 1, wherein the second electrode substrate comprises glass.

53. An electrochromic pane arrangement as defined in claim 1, wherein the first and the second electrode substrates each comprise glass.

54. An electrochromic pane arrangement as defined in claim 1, wherein said actively electrochromic layer comprises tungsten trioxide.

55. An electrochromic panel structure comprising:

a first transparent electrode substrate; a second transparent electrode substrate disposed in parallel spaced apart relationship to said first transparent electrode substrate; a first transparent electrode layer disposed on a surface of the first transparent electrode substrate; an electrochromic layer disposed on the first transparent electrode layer opposite the first transparent electrode substrate; a second transparent electrode layer disposed on a surface of the second transparent electrode substrate; a third transparent layer disposed on the second transparent electrode layer capable of reversibly storing a charge by ion insertion; an ion conducting layer having a first surface disposed in surface contact with the electrochromic layer and a second surface disposed in surface contact with third transparent layer, said ion conducting layer comprising a polymer matrix containing at least one salt including a difficult to oxidize anion, at least one dopant capable of providing cations and at least one salt including an easy to oxidize anion; and means for electrically connecting the first transparent electrode layer and the second transparent electrode layer to a voltage source, whereby a transmission property of the electrochromic layer selected from transparency, color or both, may be reversibly varied by absorption or emission of electrons from the first electrode layer into the electrochromic layer and acceptance or emission of ions of the dopant from or into the ion conducting layer and reversible storage of charge by the third transparent layer.

56. An electrochromic pane arrangement comprising: a first transparent electrode substrate, a second electrode substrate arranged parallel to and at a distance from the first transparent electrode substrate, and an ion conducting layer joining the first and second electrode substrates comprising a polymer matrix, at least one salt including difficult to oxidise anions, at least one dopant for providing cations, at least one salt including easy to oxidise anions, and at least one easily oxidisable organic compound, which is electrically neutral and undergoes no color change upon changing the transmission of the electrochromic pane arrangement, wherein a surface of the first transparent electrode substrate facing towards the ion conducting layer includes a first transparent electrode layer disposed thereon and an actively electrochromic layer disposed on the first transparent electrode layer in surface contact with the ion conducting layer whose transparency and/or color is reversibly variable as a result of absorption or emission of electrons via the first electrode layer and acceptance or emission of ions of the dopant from/to the ion conducting layer, and a surface of the second electrode substrate facing towards the ion conducting layer including a second transparent electrode layer disposed thereon, and a third transparent layer disposed on the second transparent electrode layer in surface contact with the ion conducting layer capable of reversibly storing charge.

* * * * *

UNITED STATES PATENT AND TRADEMARK OFFICE
CERTIFICATE OF CORRECTION

PATENT NO. : 5,859,723
DATED : January 12, 1999
INVENTOR(S) : Jödicke et al.

It is certified that error appears in the above-indentified patent and that said Letters Patent is hereby corrected as shown below:

In claim 11 (column 10, line 55) cancel "10" and substitute --56-- therefor.

Signed and Sealed this

Twentieth Day of February, 2001

Attest:

NICHOLAS P. GODICI

Attesting Officer    Acting Director of the United States Patent and Trademark Office